Sept. 15, 1970 E. M. MOORE 3,528,588
FISH FEEDER WITH MEASURING DISPENSER
Filed June 12, 1968 2 Sheets-Sheet 1
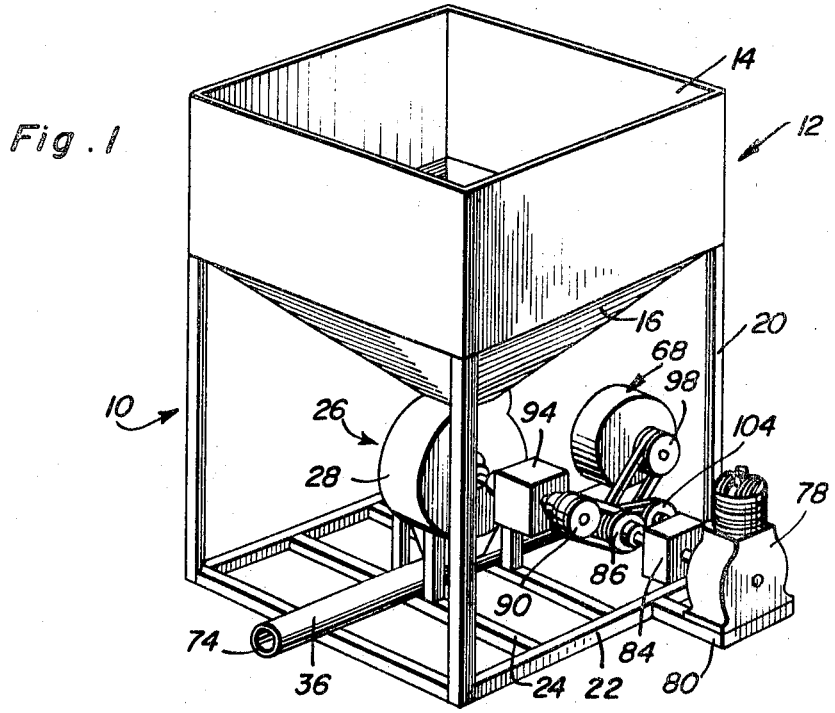
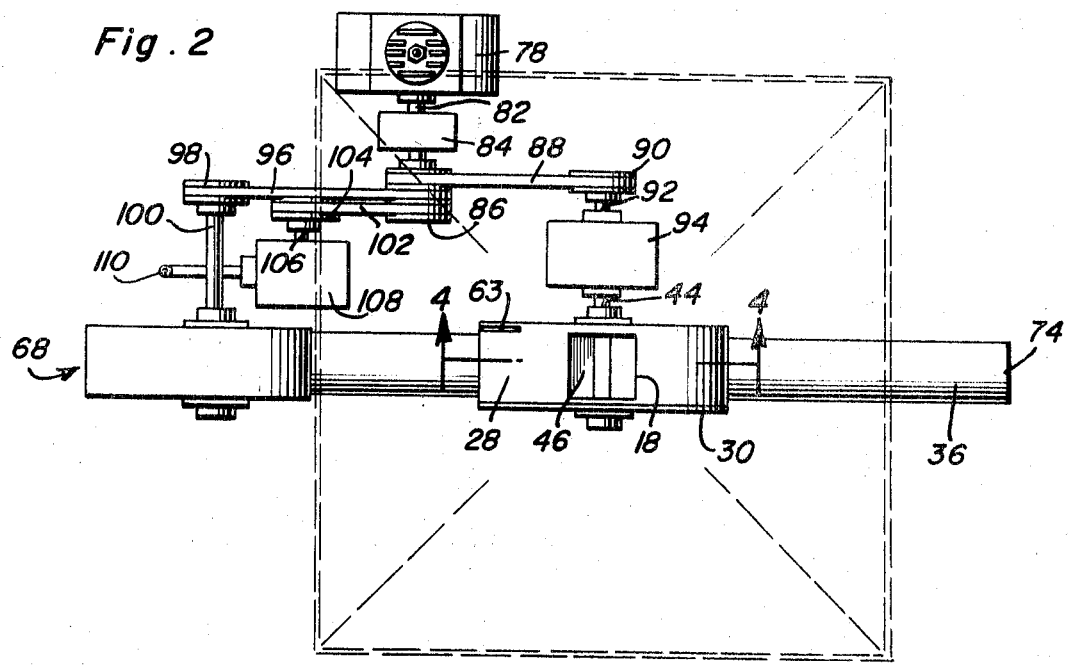
Emanuel M. Moore
INVENTOR.

Emanuel M. Moore
INVENTOR.

United States Patent Office 3,528,588
Patented Sept. 15, 1970

3,528,588
FISH FEEDER WITH MEASURING DISPENSER
Emanuel M. Moore, 111½ E. 4th Ave.,
Pine Bluff, Ark. 71601
Filed June 12, 1968, Ser. No. 736,444
Int. Cl. G01f *11/10*
U.S. Cl. 222—193                 5 Claims

ABSTRACT OF THE DISCLOSURE

A fish feeder having a hopper and a measuring dispenser structure associated with the bottom thereof and a blower structure for discharging air through a discharge pipe into which the feed is dispensed for discharge into a fish pond or the like.

---

The present invention generally relates to fish feeding devices and more particularly a device for dispensing measured quantities of granular feed onto the surface of a fish pond.

The raising of fish in fish ponds under controlled conditions has been practiced recently and has become economically feasible in view of increased demand for the product and the reduction in the natural supply thereof. One of the problems encountered in feeding fish in fish ponds is the dispensing of feed to the fish. Acceptable feeding material is commercially available and is provided in granular or pelletized form. In one particular operation, the feeding of catfish in a fish pond requires that the pelletized feed be dispensed onto the surface of the water in the fish pond over a relatively large area thereof and spaced away from the sloping surface of the bank of the pond in order to enable all of the fish to have access to the feed material. In addition, it is necessary to measure and control the quantity of feed being dispensed to a particular pond and it is also necessary to increase the quantity of feed per feeding as the fish in the pond grow older and larger and thus are capable of consuming more feed.

Accordingly, it is an object of the present invention to provide a fish feeder having a measuring dispenser associated therewith for measuring the quantity of feed to be discharged together with a blower for entraining the feed and discharging it through a discharge pipe over a relatively large surface area of the fish pond.

Another object of the present invention is to provide a fish feeder in accordance with the preceding object in which the measuring dispenser includes a rotatable drum having pockets therein with the pockets being of variable size together with inserts to close all except one of the pockets to enable the quantity of material discharged by the measuring dispenser to be altered by inserting filler inserts into selective pockets.

Still a further object of the present invention is to provide a fish feeder in accordance with the preceding objects which is portable and self-contained thereby enabling it to be placed on any suitable conveyance such as a flat bed truck, skid, trailer towed by a tractor, wagon or any other similar conveyance with the power necessary for operating the fish feeder being provided by a suitable internal combustion engine of relatively small horsepower.

Still another important object of the present invention is to provide a fish feeder which is relatively simple in construction, easy to operate and control, durable and long lasting in operation, effective for its purposes and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of the fish feeder of the present invention with the top of the hopper removed;

FIG. 2 is a top plan view of the measuring dispenser, blower and associated drive structure with the hopper illustrated in dotted line;

Figure 3:
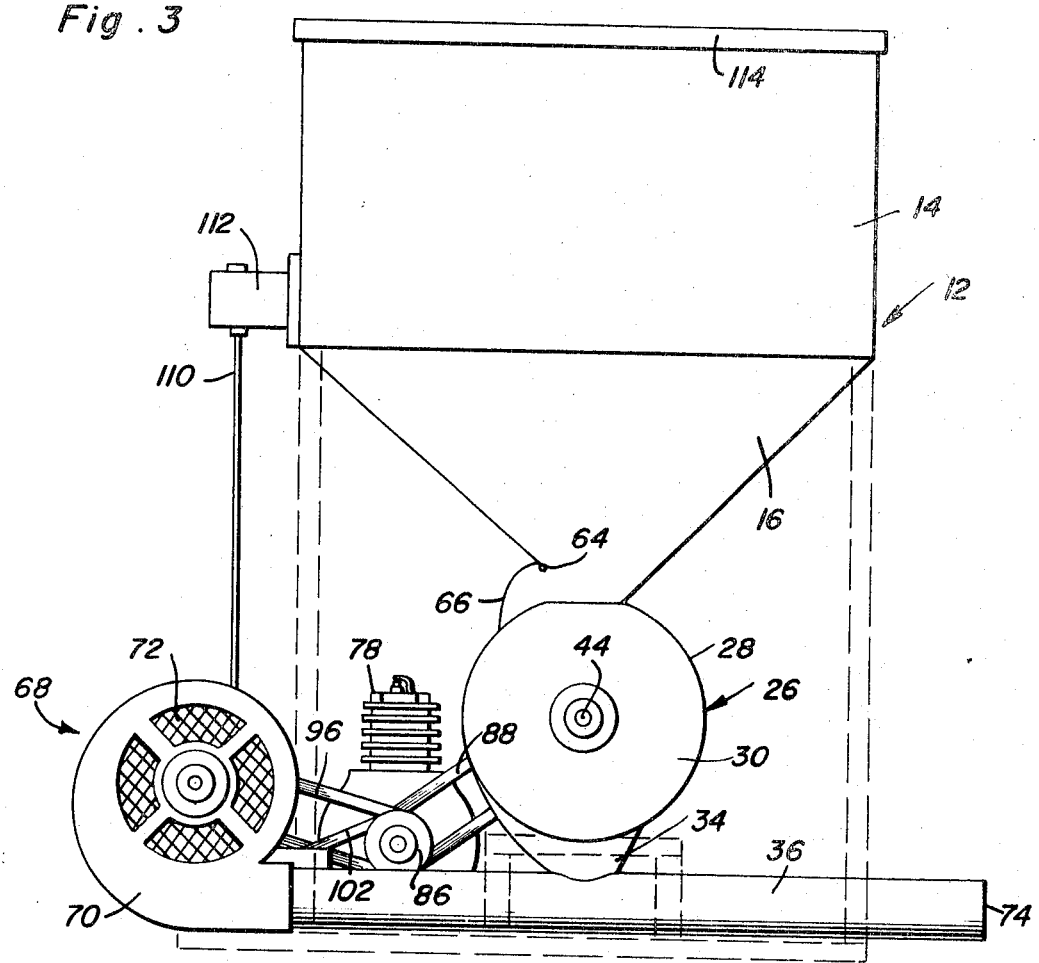
FIG. 3 is a side elevational view of the fish feeder with the supporting platform and standards being illustrated in dotted line for clarity.
Figure 4:
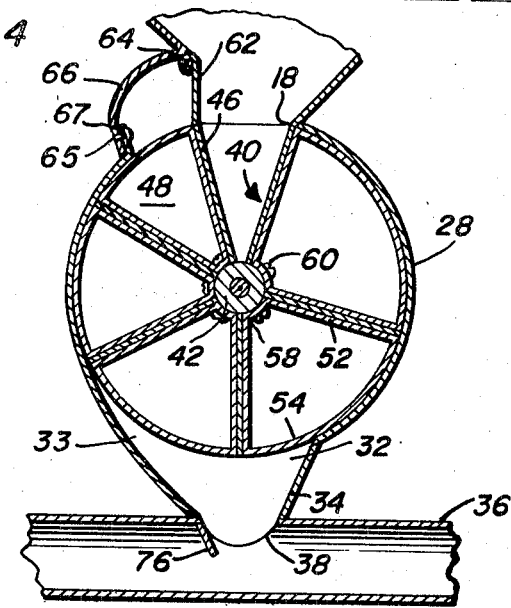
Figure 5:
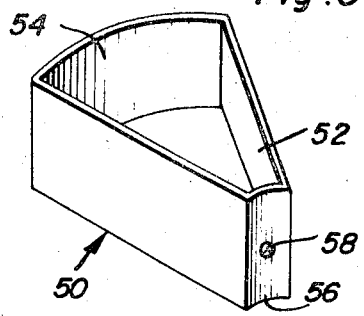

FIG. 4 is a vertical, sectional view, on an enlarged scale, taken substantially upon a plane passing along section line 4—4 of FIG. 2 illustrating the specific structural details of the measuring dispenser including the rotatable pocketed drum with inserts in all of the pockets except for one; and FIG. 5 is a perspective view of one of the inserts for the pocket of the rotatable drum in the measuring dispenser.

Referring now specifically to the drawings, the fish feeder of the present invention is generally designated by the numeral 10 and icnludes a vertically disposed hopper generally designated by the numeral 12 which is substantially square in configuration although the particular shape, size and orientation may be varied. The hopper 12 includes vertical side walls 14 arranged in perpendicular relation to each other together with inwardly converging and slanted bottom walls 16 terminating in a discharge opening 18 at their bottom apex as illustrated in FIG. 4. The hopper 12 is supported at its corners by vertical standards 20 which terminate at their lower ends in a substantially horizontal plane with the bottom ends of the standards 20 being interconnected by horizontal frame members 22 which are perpendicular to each other and perpendicular to the standards 20. Transverse frame members 24 interconnect opposed side frame members 22 to form a supporting deck or platform for engaging a supporting surface on which the fish feeder is mounted. For example, the fish feeder may be supported on the platform or load bed of a conventional truck, a skid or trailer towed by a tractor or draft animals or the device may be rendered portable in any suitable manner.

Disposed below and in communication with the discharge opening 18 of the hopper 12 is a measuring dispenser generally designated by the numeral 26 which includes a vertically oriented cylindrical housing 28 having circular closure plates 30 thereon with one of the closure plates 30 being removable by readily accessible fastening devices such as bolts or the like or the closure plate 30 may be secured in any manner to enable easy removal thereof to provide access into the interior of the cylindrical housing 28. The upper end of the cylindrical housing 28 has an open area communicating with the discharge 18 of the hopper 12 and the opposite lower end thereof is provided with a discharge opening 32 defined by a discharge tube 34 which tapers downwardly slightly and is joined with and communicated with a discharge pipe 36 which has an opening 38 therein communicated with the discharge tube 34.

Rotatable within the housing 28 is a paddle wheel structure or drum generally designated by the numeral 40 and which includes a central hub 42 mounted on a shaft 44 extending centrally through the housing 28. Rigid with the hub 42 is a plurality of plates or blades 46 which extend radially and which are spaced from each other with the spacing between adjacent blades being varied to define radially opening pockets of different sizes around the periphery of the hub 42 so that as the pockets 48 defined by adjacent pairs of said blades or plates 46 are aligned with the discharge opening 18, different quantities of material will be received therein depending upon the size of the pocket.

To close the pockets 48, a plurality of filler inserts are provided. FIG. 5 illustrates a typical insert generally designated by the numeral 50 and this includes a pair of radial plates 52 diverging outwardly with the outer ends thereof interconnected by an elongated arcuate plate 54 and the inner ends thereof being interconnected by a shorter arcuate plate 56 having an aperture 58 therein for receiving a fastening bolt 60 or the like in order to mount the filler insert 50 in a pocker 48. The width of the insert 50 corresponds to the width of the plates or blades 46 and thus forms a complete closure for a pocket to prevent granular material or pelletized feed from entering the pocket in which it is inserted. It will be appreciated that the filler inserts correspond in size and shape to the pockets to completely fill the pocket in which it is inserted. Thus, by filling all of the pockets with filler inserts except for one pocket which is left open, each time the paddle wheel or drum rotates one revolution, it will receive a predetermined quantity of material in the pocket through the opening 18 and then move it peripherally and discharge it through the discharge tube 34 into the discharge pipe 36. As the fish grow older and increase in size, the plate 30 will be removed and the appropriate filler insert 50 may be inserted and the filler insert removed from the next larger pocket thus increasing the output of the measuring dispenser by increasing the volume of the pocket in the rotatable paddle wheel or drum which is capable of receiving material from the hopper 12 and discharging it into the discharge pipe 36.

In the event the granular or pelletized feed material has lumps therein, it sometimes may occur that such a lump would be trapped between the edge of the opening 18 and the trailing edge of the pocket 48 as the trailing edge of the pocket 48 approaches the opposing edge of the discharge opening 18. To prevent jamming, the trailing edge of the opening 18 is provided with a pivotal section 62 spring-biased to a normal position about a hinge pin 64 so that if a lump of feed is engaged with the edge of the opening 18, the pivotal section 62 may swing outwardly to enable the lump to move into the area formerly occupied by the pivotal section 62. Then as the empty pocket 48 again becomes aligned with the discharge opening 18, the spring pressure on the plate 62 will cause the lump to be discharged into the pocket 48 along with the initial material discharged from the hopper through the opening 18 and the plate 62 will return to its normal position. To prevent loss of feed during pivotal movement of the plate 62, the housing 28 is provided with a corresponding offset portion 66 which provides a closure for the area in which the plate 62 pivots.

The discharge tube 36 is communicated with a blower generally designated by the numeral 68 which has a tangential discharge 70 and a central screened inlet 72. Air is discharged from the fan 68 through the discharge tube 36 which is substantially horizontally disposed so that feed discharge through the opening 38 will be entrained in the air and discharged out through the discharge end of the pipe 36 with the discharge end of the pipe being designated by numeral 74. To prevent entry of air into the discharge opening 32, a depending baffle 76 is provided on the approach side of the opening 38 so that air impinging against the baffle 76 will move downwardly and the increase in turbulence of the air at this point will more effectively pick up and entrain the feed in the air column for discharge through the discharge end 74 of the pipe 36 which assures that the granular or pelletized feed will be scattered over a relatively wide surface area in view of the intimate commingling of the air and feed.

Any suitable means may be provided for driving the blower and also the rotating drum or paddle wheel in the measuring dispenser 26. One arrangement which has been found quite successful is the use of a relatively small horsepower air cooled internal combustion engine 78 mounted on a suitable platform or supporting structure 80 and being of conventional construction and provided with an output shaft 82 having a conventional centrifugal clutch 84 incorporated therein for driving a multiple sheave drive pulley assembly 86 with the centrifugal clutch 84 enabling the engine to be started without load and as soon as it reaches a predetermined speed, the clutch 84 will automatically actuate and drive the multiple sheave pulley 86.

One sheave of the pulley 86 drives a belt 88 which is entrained about a pulley 90 driving the input shaft 92 of a reduction gear assembly 94 which has an output shaft 44 on which the paddle wheel or drum 40 of the measuring dispenser 26 is mounted. Inasmuch as the engine 76 is of a governor controlled constant speed, the reduction gear box 94 is selected to provide the output shaft 44 with a single r.p.m. output when the engine 78 is operated at the conventional and normal operating speed.

Another pulley on the multiple sheave pulley 86 is drivingly engaged with a belt 96 entrained around a pulley 98 mounted on a drive shaft 100 which extends into the blower 68 for driving the impeller therein so that air will be taken into the inlet 72 and discharged through the discharge pipe 70 in the conventional manner of a centrifugal type blower or squirrel cage type of blower.

The other pulley on the multiple sheave pulley 86 is drivingly connected with a drive belt 102 engaged with a pulley 104 mounted on a drive shaft 106 extending into an air compressor 108. The air compressor 108 has an air line 110 extending vertically upwardly and communicated with a vibrator 112 which is mounted on the hopper 12 in any suitable manner. The vibrator 112 is a conventional commercially available air driven vibrator and the air compressor 108 is also a commercially available air compressor and illustrated schematically in the drawings as is the centrifugal clutch 84 and gear box 94.

Also, the hopper 12 is provided with a closure lid 114 to protect the interior of the hopper from entry of rain and other material which should be excluded from the feed. The use of the vibrator serves to prevent the granular feed from bridging over the discharge opening 18 and if desired, a flexible connection may be provided between the hopper 12 and the measuring dispenser 26 which may be easily accomplished by providing a flexible tubular connection therebetween to isolate the vibration of the hopper. This isolation may be further accomplished by providing resilient mountings for the hopper 12 on the supporting standards 20 in a conventional manner.

While the housing 28 has been defined as a cylindrical housing, as illustrated in FIG. 4, the portion of the housing where it merges with the discharge opening 32 diverges from the periphery of the rotating drum 40 as designated by numeral 33 so that the peripheral wall of the cylindrical housing 28 where it merges with the chute 34 will diverge away from the periphery of the drum. This structure enables the material within the pocket to begin discharging at an earlier point in its rotation. When a pocket filled with feed registers with the area 33, a portion of the feed will be discharged therefrom and will continue to discharge therefrom until the filled pocket reaches substantially a vertical position. It is pointed out that the distance from the plate 62 to the area 33 is an angular extent at least equal to the angular extent of the largest pocket formed in the drum so that at no time will there be a direct communication between the chute opening 18 and the discharge opening 32 thereby assuring constant and accurate metering of the feed material. Also, a portion of the housing 28 where it connects with the offset area 66 which receives the pivotal member 62 when it is engaged by a lump is provided with an upturned flange 67 which is slotted and provided with a fastener 65 to permit relative outward flexing of this portion of the housing 28 which is not attached to the sidewalls inasmuch as one sidewall 30 is removable and a slit 63 is provided in the wall 28 adjacent the other sidewall thereof to permit resilient flexing and slight outward movement of the flange 67. Thus, by constructing the housing 28 out of a resilient sheet material, the trailing edge of a pocket 48 passing the edge of the housing 28 where the flange 67 occurs will not cause injury to the housing or the drum inasmuch as if any feed is caught between the trailing edge of the pocket 48 and the lower edge of the flange 67 where it is integral with the housing 28, it will merely move the flange 67 upwardly slightly and any material disposed in this area will then drop back into the pocket the next time it registers with the opening 18. The fastener 65 prevents any possibility of the flexibile resilient portion of the housing 28 from dropping into the path of movement of the blades on the drum.

By mounting the fish feeder on a flat bed of a truck or other similar conveyance and towing it alongside of a fish pond, the quantity of feed discharged may be determined by timing the operating cycle so that a predetermined quantity of feed may be discharged over the surface of the pond by driving the truck or other conveyance along the periphery thereof. This enables the truck to be operated at a normally safe speed so that the predetermined quantity of feed is discharged on the pond during the normal time that it requires the truck or other conveyance to move completely around the periphery of the pond or around a predetermined portion of the periphery thereof depending upon the particular layout of the pond in relation to other adjacent ponds or other obstructions.

In constructing the housing, the offset area 66, flange 67 and adjacent portion of the housing may be constructed of any suitable flexible resilient material such as a rubberized flexible material or the device may be constructed of plastic materials having sufficient flexibility and resiliency to enable the relatively slight movement necessary to enable proper operation of the device.

In addition, the inserts 50 may have closed sidewalls or the device may be substantially T-shaped with the arcuate wall 54 forming a closure for the pocket. Rather than employing a bolt-type securing device, the hub 42 could be provided with an axial tongue while the plate 56 could be provided with a corresponding groove, both of dovetailed configuration, to slidably interlock the filler insert 50 with the hub 42 thus materially simplifying the removal and insertion of the filler inserts. The housing as well as the chute, pipe and rotary drum as well as the filler inserts may all be constructed of suitable materials including metal, plastics or the like capable of long lasting and dependable use.

The foregoing is considered as illustrative only of the principles of the invention. Further, since numerous modifications and changes will readily occur to those skilled in the art, it is not desired to limit the invention to the exact construcion and operaion shown and described, and accordingly all suitable modifications and equivalents may be resorted to, falling within the scope of the invention as claimed.

What is claimed as new is as follows:

1. A fish feeding device comprising hopper means having a discharge at the bottom thereof, measuring dispenser means communicating with the hopper means and receiving material therefrom, and blower means having a discharge line associated therewith, and means communicating with the measuring dispenser means for entraining the material discharged by the measuring dispenser means with air conveyed by the blower means and a discharge pipe for discharging a mixture of air and material onto the surface of a fish pond, said measuring dispenser comprising a housing having a substantially cylindrical interior disposed vertically below the hopper means with a portion of the circumference thereof communicating with the discharge from the hopper means, a rotatable rotor disposed within said housing and including a plurality of radially opening pockets with each pocket being defined by a pair of radially disposed plates, adjacent pairs of said plates being spaced apart varying distances to provide pockets of different volumes around the periphery of the rotor, and filler inserts for selective pockets to enable a pocket of predetermined size to communicate with the hopper means for receiving material therefrom when the rotor is rotated, said means communicating with the measuring dispenser means including a discharge tube communicated with the housing in the area thereof opposite to the hopper means and below the housing for gravity discharge of material into the discharge tube.

2. The structure as defined in claim 1 wherein said discharge tube on the measuring dispenser means communicates with a discharge pipe on the blower means in spaced relation to the blower means for entrainment of the material in the airstream without passing through the blower means.

3. The structure as defined in claim 2 wherein said discharge tube includes a projecting baffle extending into the discharge pipe on the approach side thereof for impingement of air against the baffle to deflect air away from the discharge tube where it communicates with the discharge pipe, said baffle being inclined downwardly and toward the discharge end of the discharge pipe.

4. The structure as defined in claim 3 wherein said housing forming a part of the measuring dispenser means includes a recessed area where it communicates with the hopper means, the lower end of the hopper means including an inclined wall having a spring-biased pivotal section to pivot into the recess in the housing to enable reception of lumps which may occur in the material.

5. A measuring dispenser for discharging a predetermined quantity of material from a supply of such material comprising a vertically disposed housing having an upper inlet means and a lower discharge means, a rotor disposed in said housing in closely fitting relation, said rotor including a plurality of radially opening pockets of different volumes communicatable with the inlet means and outlet means, and filler inserts conforming in shape and size to each of the pockets for reception in selective pockets to enable the quantity of material discharged for each revolution of the rotor to be varied from a minimum quantity equal to the volume of the smallest pocket to a maximum quantity equal to the aggregate volume of all the pockets.

References Cited

UNITED STATES PATENTS

| 2,099,315 | 11/1937 | Prochazka | 302—49 X |
| 1,226,108 | 5/1917 | Olney | 222—368 X |
| 1,482,495 | 2/1924 | Westhaver | 222—193 |
| 2,785,831 | 3/1957 | Smolin | 222—305 X |
| 3,231,314 | 1/1966 | Cook | 302—49 |

FOREIGN PATENTS 1,135,824  8/1962  Germany.

ROBERT B. REEVES, Primary Examiner

H. S. LANE, Assistant Examiner

U.S. Cl. X.R.

119—51; 222—305